United States Patent
Sethumadhavan et al.

(10) Patent No.: US 9,887,833 B2
(45) Date of Patent: Feb. 6, 2018

(54) SYSTEMS AND METHODS TO COUNTER SIDE CHANNEL ATTACKS

(71) Applicant: The Trustees of Columbia University in the City of New York, New York, NY (US)

(72) Inventors: Lakshminarasimhan Sethumadhavan, New York, NY (US); Robert Martin, San Mateo, CA (US); John Demme, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 14/383,206

(22) PCT Filed: Feb. 27, 2013

(86) PCT No.: PCT/US2013/027871
§ 371 (c)(1),
(2) Date: Sep. 5, 2014

(87) PCT Pub. No.: WO2013/172913
PCT Pub. Date: Nov. 21, 2013

(65) Prior Publication Data
US 2015/0082434 A1    Mar. 19, 2015

Related U.S. Application Data

(60) Provisional application No. 61/707,586, filed on Sep. 28, 2012, provisional application No. 61/607,998, filed on Mar. 7, 2012.

(51) Int. Cl.
*H04L 9/00* (2006.01)
*G06F 21/75* (2013.01)
*G06F 21/55* (2013.01)

(52) U.S. Cl.
CPC ............ *H04L 9/005* (2013.01); *G06F 21/556* (2013.01); *G06F 21/75* (2013.01)

(58) Field of Classification Search
CPC ........ G06F 21/556; H04L 9/005; H04L 9/002
See application file for complete search history.

(56) References Cited

U.S. PATENT DOCUMENTS 6,175,850 B1 * 1/2001 Ishii ........................ G06F 7/723
   708/491
6,278,783 B1 * 8/2001 Kocher ................ G06F 21/556
   380/277

(Continued)

OTHER PUBLICATIONS

Wray, John C.; An Analysis of Covert Timing Channels; 1991; Retrieved from the Internet <URL: ieeexplore.ieee.org/xpls/abs_all.jsp?arnumber=130767>; pp. 1-6 as printed.*

(Continued)

*Primary Examiner* — Zachary A Davis
(74) *Attorney, Agent, or Firm* — Occhiuti & Rohlicek LLP

(57) ABSTRACT

Disclosed are devices, systems, apparatus, methods, products, and other implementations, including a method that includes identifying a process to obtain timing information of a processor-based device, and in response to identifying the process to obtain the timing information, delaying delivery of the timing information for a time-delay period. In some embodiments, identifying the process to obtain the timing information may include identifying a request to obtain the timing information of the processor-based device. In some embodiments, identifying the process to obtain the timing information may include identifying a memory-access process.

27 Claims, 6 Drawing Sheets

(56) References Cited

U.S. PATENT DOCUMENTS

| | | | |
|---|---|---|---|
| 7,065,788 B2 | 6/2006 | Yajima et al. | |
| 7,254,586 B2* | 8/2007 | Chen | G06F 21/14 707/999.001 |
| 7,318,145 B1* | 1/2008 | Stribaek | G06F 9/30072 712/219 |
| 7,895,327 B2* | 2/2011 | Klimov | G06F 21/75 709/200 |
| 8,473,751 B2* | 6/2013 | Rivain | H04L 9/003 380/28 |
| 8,627,422 B2* | 1/2014 | Hawkes | H04L 63/166 380/255 |
| 8,653,938 B2* | 2/2014 | Savry | G06K 7/0008 340/12.51 |
| 8,781,111 B2* | 7/2014 | Qi | G06F 7/723 380/255 |
| 9,195,492 B2* | 11/2015 | Fine | G06F 9/45533 |
| 9,213,360 B2* | 12/2015 | Ishii | G06F 1/14 |
| 9,495,111 B2* | 11/2016 | Hars | G09C 1/00 |
| 9,514,300 B2* | 12/2016 | Uner | G06F 21/50 |
| 2001/0014945 A1 | 8/2001 | Muschenborn | |
| 2004/0143747 A1* | 7/2004 | Eckstein | G06F 21/76 713/189 |
| 2005/0198404 A1* | 9/2005 | Kawakami | G06F 12/1408 710/1 |
| 2007/0180285 A1 | 8/2007 | Dembo | |
| 2009/0010424 A1* | 1/2009 | Qi | G06F 7/723 380/28 |
| 2009/0083392 A1* | 3/2009 | Wong | H04L 67/1097 709/212 |
| 2009/0092245 A1 | 4/2009 | Fumaroli et al. | |
| 2009/0097637 A1 | 4/2009 | Boscher et al. | |
| 2009/0172304 A1* | 7/2009 | Gueron | G06F 12/0802 711/154 |
| 2009/0183009 A1 | 7/2009 | Delfs et al. | |
| 2009/0214025 A1 | 8/2009 | Golic | |
| 2011/0078549 A1* | 3/2011 | Thueringer | H04L 9/3271 714/807 |
| 2011/0145595 A1 | 6/2011 | Kim et al. | |
| 2011/0260749 A1 | 10/2011 | Deas et al. | |
| 2011/0285420 A1 | 11/2011 | Deas et al. | |
| 2011/0285421 A1 | 11/2011 | Deas et al. | |
| 2012/0042145 A1 | 2/2012 | Sehr et al. | |
| 2012/0124393 A1 | 5/2012 | Sethumadhavan et al. | |
| 2012/0216242 A1* | 8/2012 | Uner | G06F 21/51 726/1 |
| 2013/0219187 A1* | 8/2013 | Furtner | G06F 21/558 713/189 |
| 2016/0103626 A1* | 4/2016 | Hars | G06F 3/0623 711/103 |

OTHER PUBLICATIONS

Giles et al.; An Information-Theoretic and Game-Theoretic Study of Timing Channels; 2002; Retrieved from the Internet <URL: ieeexplore.ieee.org/xpls/abs_all.jsp?arnumber=1027777&tag=1>; pp. 1-23 as printed.*
Magenheiber, Dan; [Xen-devel] RE: rdtsc: correctness vs performance on Xen (and KVM?); 2009; Retrieved from the Internet <URL: old-list-archives.xenproject.org/xen-devel/2009-08/msg01209.html>; pp. 1-4 as printed.*
Hu, Wei-Ming; Reducing Timing Channels with Fuzzy Time; 1991; Retrieved from the Internet <URL: http://ieeexplore.ieee.org/xpls/abs_all.jsp?arnumber=130768>; pp. 1-13 as printed.*
NSA. (1972). Tempest: A Signal Problem. Cryptologic Spectrum, 26-30. Retrieved from http://www.nsa.gov/public_info/_files/cryptologic_spectrum/tempest.pdf.
Min, S. L., & Choi, J. D. (Apr. 1991). An efficient cache-based access anomaly detection scheme. ACM SIGPLAN Notices—Special issue of a journal and a proceedings, 26(4), 235-244. ACM . . . .
Prvulovic, M., & Torrellas, J. (Jun. 2003). ReEnact: Using thread-level speculation mechanisms to debug data races in multithreaded codes. Proceedings of the 30th Annual International Symposium on Computer Architecture (ISCA '03), 110-121. IEEE. Retrieved from http://mprc.pku.edu.cn/~liuxianhua/chn/corpus/Notes/articles/isca/ISCA2003/DATA/03B_02.PDF.
Bernstein, D. J. (Nov. 11, 2004). Cache-timing attacks on AES. 37 pgs. Retrieved from http://cr.yp.to/papers.html#cachetiming.
Page, D. (2005). Partitioned Cache Architecture as a Side-Channel Defence Mechanism. IACR Cryptology ePrint Archive, Report 2005/280. Retrieved from http://eprint.iacr.org/2005/280.
Osvik, D. A., Shamir, A., & Tromer, E. (2006). Cache attacks and countermeasures: the case of AES. Topics in Cryptology—CT-RSA 2006, 1-20. Springer Berlin Heidelberg.
Aciiçmez, O., Koç, ç. K., & Seifert, J. P. (Nov. 23, 2006). On the power of simple branch prediction analysis. 16 pgs. IACR Cryptology ePrint Archive, Report 2006/351. Retrieved from http://eprint.iacr.org/2006/351.pdf.
Wang, Z., & Lee, R. B. (Dec. 2006). Covert and side channels due to processor architecture. 22nd Annual Computer Security Applications Conference (ACSAC' 06), 473-482. IEEE.
Neve, M., & Seifert, J.P. (2007). Advances on Access-driven Cache Attacks on AES. Selected Areas in Cryptography: 13th International Workshop (SAC 2006), 147-162. Springer Berlin Heidelberg.
Wang, Z., & Lee, R. B. (Jun. 2007). New cache designs for thwarting software cache-based side channel attacks. ACM SIGARCH Computer Architecture News, 35(2),494-505. ACM.
Aciiçmez, O. (Nov. 2007). Yet another microarchitectural attack: exploiting I-cache. Proceedings of the 2007 ACM Workshop on Computer Security Architecture (CSAW '07). 11-18. ACM.
Wang, Z., & Lee, R. B. (Nov. 2008). A novel cache architecture with enhanced performance and security. 41st IEEE/ACM International Symposium on Microarchitecture (MICRO-41),83-93. IEEE.
Martlau1978. (May 14, 2009). Possible rdtsc bug [Online forum comment]. Retrieved from https://software.intel.com/en-us/forums/topic/296658#.
Muzahid, A., Suárez, D., Qi, S., & Torrellas, J. (Jun. 2009). SigRace: signature-based data race detection. ACM SIGARCH Computer Architecture News, 37(3), 337-348. ACM. Retrieved from http://www.cs.utsa.edu/~muzahid/pdfs/sigrace_isca09.pdf.
Ristenpart, T., Tromer, E., Shacham, H., & Savage, S. (Nov. 2009). Hey, you, get off of my cloud: exploring information leakage in third-party compute clouds. Proceedings of the 16th ACM Conference on Computer and Communications Security (CCS '09), 199-212. ACM. Retrieved from http://delta-apache-vm.cs.tau.ac.il/~tromer/papers/cloudsec.pdf.
Lawson, N. (Dec. 31, 2009). Side-Channel Attacks on Cryptographic Software. Security & Privacy, 7(6), 65-68. IEEE.
Bangerter, E., Gullasch, D., & Krenn, S. (2010). Cache games—bringing access based cache attacks on AES to practice. IACR Cryptology ePrint Archive, Report 2010/594. Retrieved from http://eprint.iacr.org/2010/594.
Jayasinghe, D., Fernando, J., Herath, R., & Ragel, R. (Dec. 2010). Remote cache timing attack on advanced encryption standard and countermeasures. Proceedings of the 5th International Conference on Information and Automation for Sustainability (ICIAFs). 177-182. IEEE. Retrieved from http://roshanr.comoj.com/docs/escal/papers/33.pdf.
Gullasch, D., Bangerter, E., & Krenn, S. (May 2011). Cache games—bringing access based cache attacks on AES to practice. 2011 IEEE Symposium on Security and Privacy (SP), 490-505. IEEE.
Demme, J., & Sethumadhavan, S. (Jun. 2011). Rapid identification of architectural bottlenecks via precise event counting. ACM SIGARCH Computer Architecture News, 39(3), 353-364. ACM. Retrieved from http://web3.cs.columbia.edu/~simha/preprint_isca11.pdf.
Greathouse, J. L., Ma, Z., Frank, M. I., Peri, R., & Austin, T. (Jun. 2011). Demand-driven software race detection using hardware performance counters. ACM SIGARCH Computer Architecture News, 39(3), 165-176. ACM. Retrieved from http://www.cse.psu.edu/~xydong/files/proceedings/ISCA2011/docs/p165.pdf.
Vattikonda, B. C., Das, S., & Shacham, H. (Oct. 2011). Eliminating fine grained timers in Xen. Proceedings of the 3rd ACM Cloud

(56) References Cited

OTHER PUBLICATIONS

Computing Security Workshop (CCSW '11), 41-46. ACM. Retrieved from http://cseweb.ucsd.edu/~bvattikonda/docs/xentimers-ccsw11.pdf.

Bar-El, H. (n.d.). Introduction to Side Channel Attacks, White Paper. 1-12. Discretix Technologies Ltd. Retrieved from http://gauss.ececs.uc.edu/Courses/c653/lectures/SideC/intro.pdf.

International Search Report & Written Opinion of the International Search Authority (US) dated Apr. 29, 2014, for International Application No. PCT/US2013/027871, 8 pgs.

International Preliminary Report on Patentability for International Application No. PCT/US2013/027871, dated Sep. 18, 2014, 6 pgs.

\* cited by examiner

SYSTEMS AND METHODS TO COUNTER SIDE CHANNEL ATTACKS

CROSS-REFERENCE TO RELATED APPLICATIONS

This application claims the benefit of, and priority to, provisional U.S. application Ser. No. 61/607,998, entitled "METHODS AND SYSTEMS FOR MITIGATING RISKS OF SIDE-CHANNEL ATTACKS, and filed Mar. 7, 2012, and to provisional U.S. application Ser. No. 61/707,586, entitled "SYSTEMS AND METHODS TO COUNTER SIDE CHANNELS ATTACKS", and filed Sep. 28, 2012, the contents of all of which are incorporated herein by reference in their entireties.

STATEMENT REGARDING FEDERALLY SPONSORED RESEARCH

This invention was made with government support under FA 865011C7190 and FA 87501020253, both awarded by the Defense Advanced Research Projects Agency (DARPA); and under Grant No. 1054844 by the National Science Foundation (NSF). The government has certain rights in the invention.

BACKGROUND

Side channel attacks are a type of computer-security threat in which attackers attempt to collect unintentional leaks (e.g., the heat or power signatures of computer components during the devices' operation, a profile of resource usage by a processor-based device during operation of the device, etc.) to compromise the confidentiality of the computation.

In one particular class of side channel attacks that rely on micro-architectural leaks, shared on-chip resources, like caches or branch predictors, are used to compromise software implementations of various applications (e.g., cryptographic applications). In one potentially dangerous attack, an attacker can record keystrokes typed in a console from another co-resident virtual machine in a cloud setting by measuring cache utilization. Microarchitectural side channel dangers are not limited to cryptographic applications or cloud installations. As system-on-chip designs become popular, the tight integration of components may make physical side channels more difficult to exploit, in which case attackers may be motivated to turn to micro-architectural leaks to learn sensitive information.

SUMMARY

The devices, systems, apparatus, methods, products, and other implementations described herein include a method including identifying a process to obtain timing information of a processor-based device, and in response to identifying the process to obtain the timing information, delaying delivery of the timing information for a time-delay period.

Embodiments of the method may include at least some of the features described in the present disclosure, including one or more of the following features.

Identifying the process to obtain the timing information may include identifying a request to obtain the timing information of the processor-based device.

Identifying the request to obtain the timing information may include identifying execution of an instruction to read a clock module of the processor-based device.

Identifying the execution of the instruction to read the clock module may include identifying execution of an instruction to read a time stamp counter (TSC) of the processor-based device.

Delaying the delivery of the timing information for the time-delay period may include delaying the delivery of the timing information for a period equal to a sum of a remainder of clock cycles in a current epoch interval and a random-based portion of the clock cycles in a following epoch interval. At least one of the current epoch interval and the following epoch interval may include a duration equal to a value in a range between $2^{e-1}$ clock cycles and $2^e-1$ clock cycles, where e is a predetermined value representative of a level of timing information obfuscation.

The at least one of the current epoch interval and the following epoch interval may include a duration equal to a random value in the range between $2^{e-1}$ clock cycles and $2^e-1$.

Delaying the delivery of the timing information for the period equal to the sum of the remainder of clock cycles in the current epoch interval and the random-based portion of the clock cycles in the following epoch interval may include stalling execution of operations to perform the request to obtain the timing information for the remainder of clock cycles in the current epoch interval, storing in a memory location a value of a time stamp counter (TSC) of the processor-based device, further stalling the execution of the operations to perform the request to obtain the timing information for the random-based portion of the clock cycles in the following epoch interval, and adding a randomly selected value from a range between 0 and interval length of the following epoch interval to the value stored in the memory location.

The method may further include returning a timing information value corresponding to a time stamp counter (TSC) value at the end of the period equal to the sum of the remainder of the clock cycles in the current epoch interval and the random-based portion of the clock cycles in the following epoch interval.

The method may further include disabling one or more countermeasures to identify and respond to one or more processes to obtain the timing information for the processor-based device.

Disabling the one or more countermeasures may include disabling the delaying of the delivery of the timing information.

Disabling the delaying of the delivery of the timing information may include disabling the delaying of the delivery of the timing information in response to a determination that an indicator is set to some pre-determined value.

Identifying the process to obtain the timing information may include identifying a memory-access process. Identifying the memory-access process may include one or more of, for example, identifying a first process including a write operation to a shared memory location followed by a read operation from the shared memory location, and/or identifying a second process including a first write operation to the shared memory location followed by a second write operation.

Delaying the delivery of the timing information for the time-delay period may include causing an exception condition for the processor-based device in response to identification of the memory-access process.

The method may further include determining time information regarding most recent access of the shared memory location, and delaying the delivery of the timing information based, at least in part, on the determined time information regarding the most recent access of the shared memory location.

Determining the time information may include determining a value of Time of Last Use (TLU) bits associated with the shared memory location.

Delaying the delivery of the timing information for the time-delay period may include delaying the delivery of the timing information for a period equal to at least a random-based period.

The processor-based device may include one or more of, for example, a microprocessor, and/or a field programmable gate array (FPGA).

The processor-based device may include a processor-based device including at least one back-door configured to facilitate unauthorized procurement of data from the processor-based device.

In some variations, a system is provided. The system includes at least one processor, and storage media comprising computer instructions. The computer instructions, when executed on the at least one processor, cause operations that include identifying a process to obtain timing information of a processor-based device, and in response to identifying the process to obtain the timing information, delaying delivery of the timing information for a time-delay period.

Embodiments of the system may include at least some of the features described in the present disclosure, including at least some of the features described above in relation to the method In some variations, a computer readable medium programmed with a set of instructions executable on at least one processor is provided. The instructions, when executed, cause operations including identifying a process to obtain timing information of a processor-based device, and in response to identifying the process to obtain the timing information, delaying delivery of the timing information for a time-delay period.

Embodiments of the computer readable media include at least some of the features described in the present disclosure, including at least some of the features described above in relation to the method and the system.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, is meant to encompass variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, is also meant to encompass variations of ±20% or ±10%, ±5%, or +0.1% from the specified value, as such variations are appropriate to in the context of the systems, devices, circuits, methods, and other implementations described herein.

As used herein, including in the claims, "or" or "and" as used in a list of items prefaced by "at least one of" or "one or more of" indicates that any combination of the listed items may be used. For example, a list of "at least one of A, B, or C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, or C" may also include AA, AAB, AAA, BB, etc.

As used herein, including in the claims, unless otherwise stated, a statement that a function, operation, or feature, is "based on" an item and/or condition means that the function, operation, function is based on the stated item and/or condition and may be based on one or more items and/or conditions in addition to the stated item and/or condition.

Unless defined otherwise, all technical and scientific terms used herein have the same meaning as commonly understood by one of ordinary skill in the art to which this disclosure belongs.

Details of one or more implementations are set forth in the accompanying drawings and in the description below. Further features, aspects, and advantages will become apparent from the description, the drawings, and the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Disclosed herein are methods, systems, apparatus, devices, products, and other implementations, including a method that includes identifying a process to obtain timing information of a processor-based device, and in response to identifying the process to obtain the timing information, delaying delivery of the timing information for a time-delay period. In some embodiments, identifying the process to obtain the timing information may include identifying a request to obtain the timing information of the processor-based device. In such embodiments, delaying the delivery of the timing information for the time-delay period may include delaying the delivery of the timing information for a period equal to a sum of a remainder of clock cycles in a current epoch interval and a random-based portion of the clock cycles in a following epoch interval, where each epoch interval includes a duration equal to a value in a range between $2^{e-1}$ clock cycles and $2^e-1$ clock cycles, and where e is a predetermined value representative of a level of timing information obfuscation. In some embodiments, identifying the process to obtain the timing information includes identifying a memory-access process, including one or more of, for example, identifying a first process including a write operation to a shared memory location followed by a read operation from the shared memory location, and/or identifying a second process including a first write operation to the shared memory location followed by a second write operation.

Figure 1:
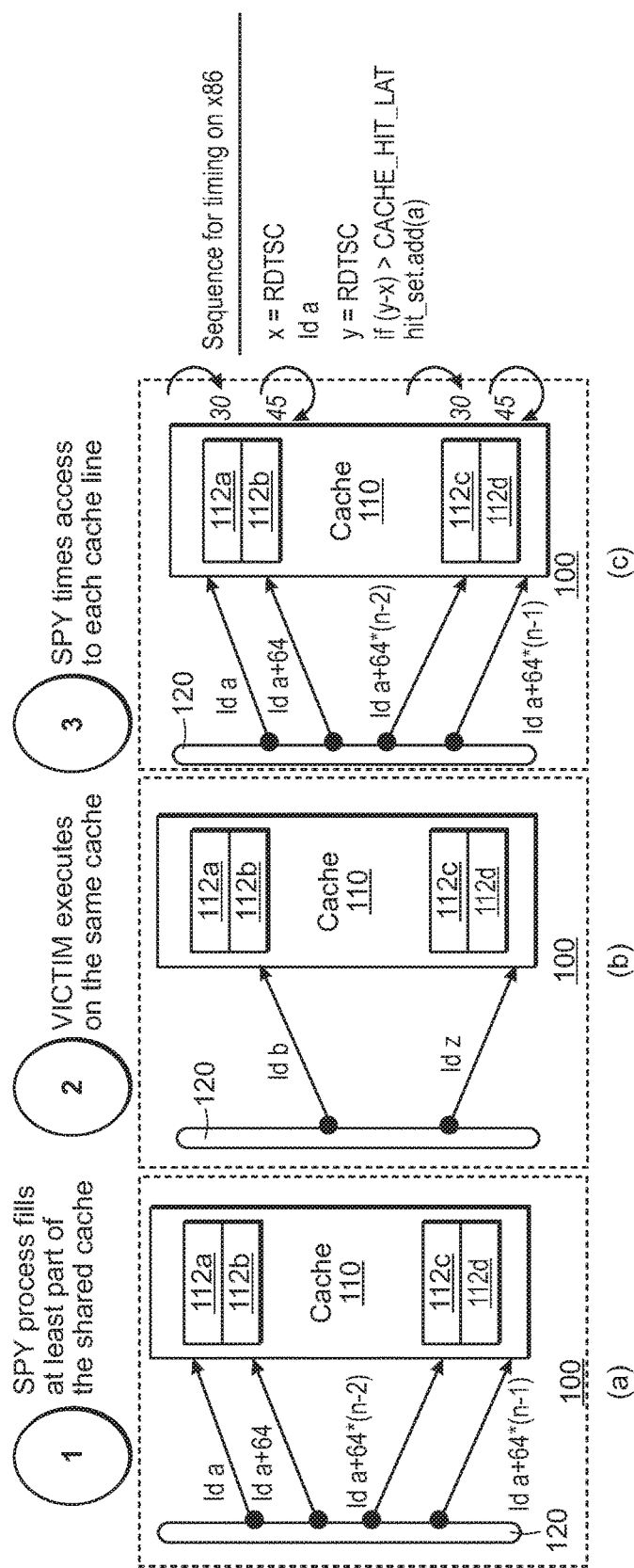
FIGS. 1a-c are diagrams illustrating example monitoring and control operations applied to a cache of a processor-based device by a spy process.
Figure 5:
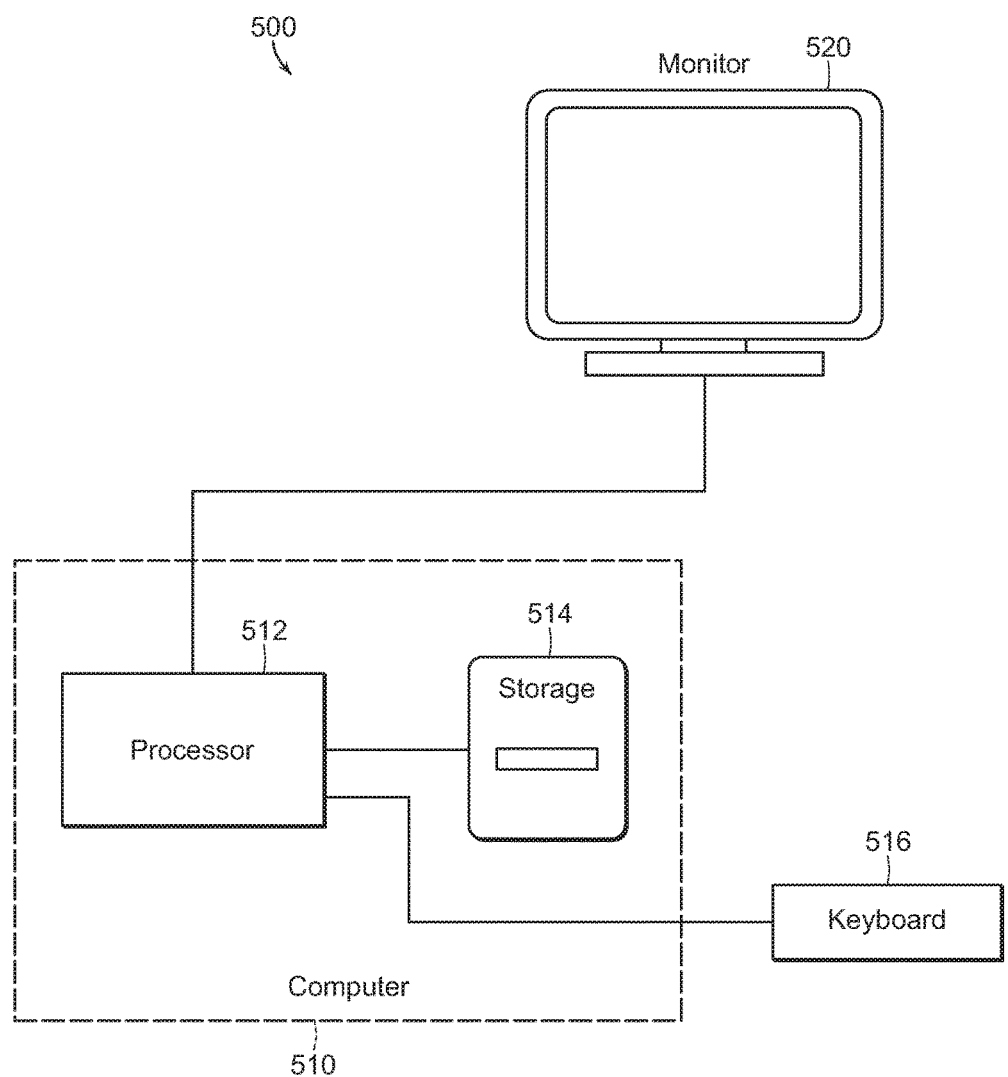
FIG. 5 is a schematic diagram of a generic computing system.

Side channel attacks, which the implementations described herein are configured to counter (or mitigate), include the "prime-probe" attack, which attempts to extract information about a victim's processes by monitoring behavior of a cache unit of the victim's processor-based device. With reference to FIGS. 1a-c, diagrams of a cache 110 whose behavior is controlled and monitored by a spy process are shown. The cache 110, in some embodiments, is part of a processor-based device 100 (shown schematically in dashed lines). Further details regarding example embodiments of processor-based devices, such as the processor-based device 100 of FIGS. 1a-c (which may include microprocessors, field programmable gate array, and other types of programmable or state-machine hardware), are provided in greater details below in relation to FIG. 5. In a prime-and-probe attack, a rogue (spy) process first "primes" cache sets with its data. Thus, as illustrated in FIG. 1a, the spy process is configured to initially access the cache 110, via, for example, a bus 120, and write its own data to one or more cache locations. In the diagram of FIG. 1a, the spy process writes/loads content into cache locations 112a, 112b, 112c, and 112d. Following the spy process' initial access and load operation, a process of the processor-based device (the victim process) may cause the cache 100 to be accessed, and to write its own data into one or more of the cache's location. In the example of FIGS. 1a-c, the victim's initiated process writes content into locations 112b and 112d (e.g., content "b" and "z," as illustrated in FIG. 1b). In loading its own content, the victim's process overwrites some of the cache locations (or lines) that were initially loaded with content by the spy process. During the "probe" phase of the side-channel attack, the spy process is configured to query cache lines/locations to determine, for example, if its data items have been overwritten. When the spy process detects a cache miss, a determination is made that the victim's process likely accessed and used that cache location to store its own data. Based on additional information about processes/algorithms used by the victim, or how the operating system (OS) manages address space, the spy process may be able to determine what data may have been used by the victim. Thus, to determine content of the victim's process, it is necessary to determine if certain micro-architectural events (such as a hit/miss on the primed line, in this case) happened. The spy process can determine this information directly using micro-architectural performance event counters, or indirectly by measuring the time for the load to return. For example, longer return times indicate misses on the cache lines.

Accordingly, to counter side-channel attacks, a process is implemented to control access to timing and micro-architectural event counters. Without any way to meaningfully measure differences between micro-architectural events, an attacking spy process would not be able to extract the signal from the noisy data. Thus, in some embodiments, a process to counter side-channel attacks is implemented that includes identifying a process that attempts to obtain timing information of a processor-based device, and, in response to identifying the process to obtain the timing information, delaying delivery of the timing information for a time-delay period.

In some embodiments, a possible source of timing information that may be used by a spy process includes timing information obtained from an internal clock(s) maintained by the processor-based device. In such embodiments, the process to counter side-channel attacks may include identifying a request to obtain timing information from the processor-based device. One way to obtain timing information from the processor-based device is through performance of dedicated instructions (which may have been defined in the processor-based device's instruction set, or may themselves be processes constituting several instruction-set instructions) that, when executed, obtain timing information from a clock module, such as a time stamp counter (TSC) maintained by the processor-based device. An example of an instruction that when executed causes accessing and reading of a clock module such as the TSC is the Read Time Stamp Counter (or RDTSC) instruction. Other instructions or processes to request timing information from various clock modules implemented on the processor-based device may also be used. Thus, a processor-based device can be configured to identify instructions such as RDTSC, or other instructions that result in the accessing and reading of a clock module such as the TSC.

In situations in which the spy process seeks to obtain timing information by causing a request for timing information from the processor-based device to be executed/performed (e.g., causing execution of an instruction such as RDTSC), the delaying of the delivery of the timing information includes delaying the delivery of the timing information for a period equal to a sum of a remainder of clock cycles in a current epoch interval and a random-based portion of the clock cycles in a following epoch interval. At least one epoch interval may include a duration equal to a value in a range between $2^{e-1}$ clock cycles and $2^e-1$ clock cycles, where e is a predetermined value representative of a level of timing information obfuscation.

The timekeeping infrastructure of a processor-based device should be sufficiently adjusted to thwart side channel measurements, but without causing significant performance degradation of other processes implemented/executed by the processor-based device. To that end, requests for timing information, whether they are legitimate requests required in the normal execution of legitimate processes, or whether they are rogue requests made as a result of the spy process, may be obfuscated by small randomized offsets. As noted, the extent of the obfuscation can be controlled by a parameter e, representative of the level of timing information obfuscation.

In some embodiments, and as will be discussed in greater details below, the obfuscation parameter e may be assigned a pre-determined value, such as zero ('0'), to indicate that the timing information obfuscation operations are to be disabled. Thus, when e is set to that pre-determined value of zero, or when the processor-based device is operating in privileged mode, requests for timing information, such as RDTSC instructions, will execute in their regular manner. This enables any timing-related OS components, like a scheduler, to operate as normal, and enables the OS to disable the obfuscation on a per-process basis for any programs that are trusted and require high fidelity timing to work properly. Thus, in such embodiments, a processor-based device, or some other hardware, may be configured to perform operations that include disabling one or more countermeasures to identify and respond to one or more processes attempting to obtain timing information for the processor-based device. Disabling the one or more countermeasures includes, in some embodiments, disabling the delaying of the delivery of the timing information. For example, the operation/functionality of delaying of the delivery of the timing information can be disabled in response to a determination that an indicator is set to some pre-determined value (e.g., when e is set 0).

Figure 2:
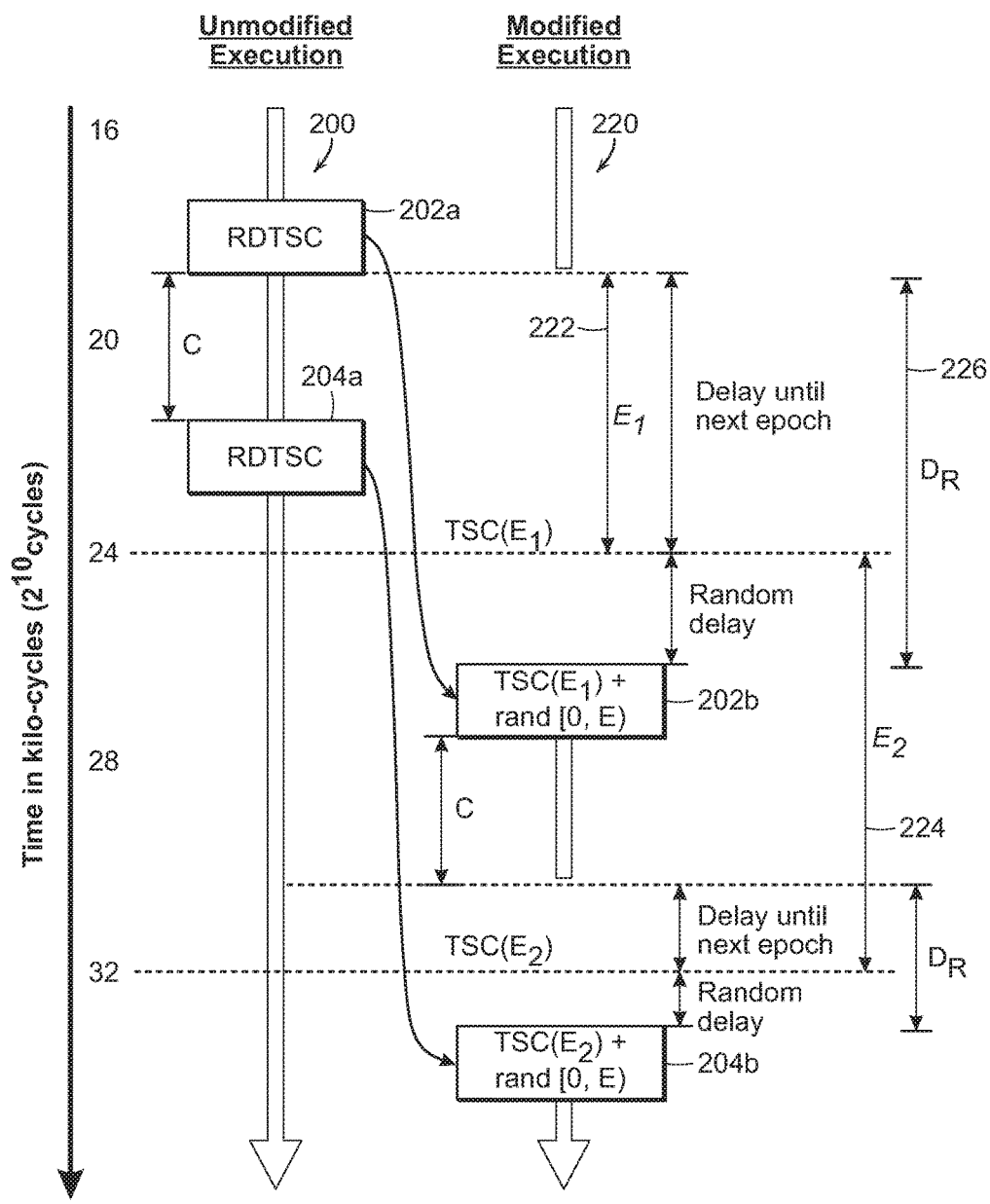
FIG. 2 includes timing diagrams illustrating execution of timing requests with, and without, added obfuscating delays.

To obfuscate delivery of timing information, a real-time delay may be inserted to stall execution of a request for timing information when the request is encountered (this delay is also referred to as the "real offset"), and by further modifying the return value of the requested timing information by some small amount called the "apparent offset." With reference to FIG. 2, timing diagrams of example processes 200 and 220 that include requests for timing requests (in this case, implemented by way of RDTSC instructions) without, and with, added obfuscating delays are shown. Each of the processes 200 and 220 illustrates performance of two RDTSC instructions (202*a* and 204*a* for the process 200, and 202*b* and 204*b* for the process 220) that are separated by a period C clock cycles. That is, during normal execution (i.e., unmodified execution) of the process 200 that includes two RDTSC instructions, the RDTSC instruction 204*a* would occur C clock cycles after occurrence of the RDTSC instruction 202*a*.

On the other hand, to obfuscate timing information, when the process 220, which includes the two RDTSC instructions 202*b* and 204*b*, is executed, upon identification of the occurrence of an RDTSC instruction, a delay in the execution of the instruction (and thus a delay in the delivery of the timing information that is obtained through execution of an RDTSC instruction) is introduced. As shown in FIG. 2 in relation to the process 220, time is divided into epochs. The epochs have non-uniform lengths that, in some embodiments, are chosen randomly as a value in a range between $2^{e-1}$ clock cycles and $2^e-1$ clock cycles, where, as noted, e is a predetermined value representative of a level of timing information obfuscation. For example, if e is set to a value of 10, a particular epoch may have a randomly chosen length/duration between $2^9$ to $(2^{10}-1)$, i.e., 512 to 1023 clock cycles. When the RDTSC instruction 202*b* is encountered during the modified execution implementation, the instruction 202*b* is, at that point, located somewhere within the current epoch $E_1$ (marked as epoch 222). In some embodiments, execution of the instruction 202*b* is delayed to the end of the current epoch $E_1$, and the value of the clock module (e.g., the TSC) is then read. That is, the TSC register would, in this implementation, be read at the end boundary (i.e., the boundary between the current epoch and the subsequent epoch) of the current epoch. Upon the reading of the TSC register, execution of the instruction 202*b* will be further delayed by a duration equal to a random portion of the length (in clock cycles) of the subsequent epoch (e.g., the subsequent epoch $E_2$, marked as epoch 224). That is, the instruction 202*b* will be delayed for a further period equal to a random portion of $E_2$, where $E_2$ may be a random value in a range of between 512 to 1023 clock cycles (assuming the value e remained at 10). The sum of these two stalls is the real offset 226, which is denoted $D_R$.

In addition to a real offset, an apparent offset may also be used to fuzz the cycle count returned in response to the request for timing information (e.g., the cycle count returned by the RDTSC instruction 202*b* in the example of FIG. 2). After the TSC register has been read at the epoch boundary, a random value in the range [0;E) (where E is the length of the subsequent epoch $E_2$) may be added. This apparent offset is generated independently of the real offset, making RDTSC instructions appear to have executed at a time completely uncorrelated to the time where execution actually resumed (i.e., in some embodiments, the random value used to generate the apparent offset may be different from the random delay used to stall the instruction after the TSC was read).

As a result of obfuscating timing information when handling requests/processes seeking to obtain timing information, malicious processes in user-space will generally not be able to make fine grain timing measurements to a granularity smaller than $2^{e-1}$, making micro-architectural events generally undetectable as long as $2^{e-1}$ is more than the largest difference between on-chip micro-architectural latencies.

In some embodiments, the process of obfuscating timing information by, for example, delaying delivery of requested timing information, and returning to the requesting spy process a value for the timing information that includes the apparent delay which is different from the real delay, may be implemented by modifying the decode stage to translate encountered requests for timing information (e.g., RDTSC instructions) into the following example pseudo instruction sequence:

a. Stall $D_{r1}$; (i.e., stall until the end of the current epoch)
b. Store TSC→$R_1$; (i.e., once the end of the current epoch is reached, read the value of TSC and store it in a register as R1)
c. Stall $D_{r2}\epsilon 0$, E);
d. Add $D_A$→$R_1$ where $D_R=D_{r1}+D_{r2}$ is the real offset and $D_A$ is the random element of the apparent offset. Both these delays should be accessible in the decode stage from a true or pseudo random number generator. Thus, in such embodiments, delaying the delivery of the timing information includes stalling execution of operations to perform the request (e.g., an RDTSC instruction) to obtain the timing information for the remainder of clock cycles in the current epoch interval, storing in a memory location (such as a register) a value of the TSC, further stalling the execution of the operations to perform the request to obtain the timing information for the random-based portion of the clock cycles in the following epoch interval, and adding a randomly selected value from a range between 0 and the interval length of the following epoch interval to the value stored in the memory location.

In some embodiments, the process of obfuscating timing information may be implemented by modifying the execution of the RDTSC instruction. Particularly, in this example implementation, the TSC module will, when queried, return a value already fuzzed by the amount $D_A$. Additionally, the execution stage will not execute the RDTSC instruction (or another type of time-information request) for $D_R$ cycles, causing a stall in the instruction pipeline.

In some embodiments, the obfuscation process may be implemented without returning the apparent delay, but instead returning the value of the TSC either at the end of the current epoch (the epoch during which the request for timing information was encountered) or the value of the TSC after the random delay following the end-of-epoch delay. It should be noted that if the TSC value is returned at the end of the current epoch, the plot of actual time versus measured time will look like a step function, which would provide some degree of obfuscation, but may nevertheless make it possible for an attacker to align the measurements at the steps. Embodiments in which the values of the TSC after the random delays are returned may also provide some degree of obfuscation, but may possibly still leave the system vulnerable if attacker can make many observations and average the results. In some embodiments, an obfuscated value of the TSC may be returned, but without actually delaying execution of the RDTSC instruction (e.g., returning the apparent delay without causing the real delay).

As noted, the level of obfuscation that may be used to obscure timing information can be controlled according to an adjustable parameter e (which may be adjusted through an appropriate user interface, be it a software or hardware interface, or through some other appropriate adjustment mechanism). In some embodiments, an instruction to obtain timing information may include a programmable parameter, such as the parameter corresponding to the obfuscation value e, which can be used to programmably control the amount of obfuscation that may be required or desired. An example of such an instruction is a TSCWF instruction ("TimeStamp Counter Warp Factor") which may be a modification of RDTSC, and which may include the syntax of, for example, 'TSCWF e'. In this example, the TSCWF instruction will include the instruction parameter e whose value, in some embodiments, may be an integer between 0 and 15 (other values and/or ranges may also be used). A value of '0' as the parameter value may indicate that obfuscation functionality is to be disabled (other values and/or other mechanisms may be used instead of, or in addition to, setting 'e' to 0 to disable the obfuscation functionality). The parameter e can thus control the epoch length as a value to be selected (e.g., randomly selected) in a range of, for example, $[2^{e-1}, 2^e-1]$. For instance, the instruction 'TSCWF 10' will set the epoch size to be between 512 and 1023 clock cycles. In some embodiments, when the CPU resets, the TSCWF parameter value may be reset to '0' so that operating systems unaware of the TSCWF instruction will still function properly. Additionally, the CPU will need to identify to the software if it supports the TSCWF instruction. To prevent and/or inhibit processes from simply granting themselves full RDTSC access, the TSCWF instruction may be, in some embodiments, a protected instruction. The TSCWF instruction will affect calls to RDTSC when the CPU is in user-mode. This will not affect the accuracy of kernel-mode calls to RDTSC.

Other implementations of time obfuscation processes that are based on causing a delay in the execution of a request for timing information and/or returning obscured (fuzzed) timing information values may also be used. In general, a process in which timing information provided by clock/timekeeping modules (such as a TSC) is obfuscated through, for example, changing the behavior of hardware timekeeping instructions and/or timekeeping infrastructure should conform to several principles of implementation. One such principle requires that modification to behavior of time-information requests will result in providing time information that maintains an increasing behavior. Another principle of implementation is that of entropy. An RDTSC instruction (or some other similar time-information request) is sometimes used to gather entropy by observing the final few bits of the returned value. The entropy gathered can be used for cryptographic purposes or other processes/algorithms that require random bits. The least significant bits of RDTSC represent randomness from OS scheduling, pipeline state, and cache state of the processor. To maintain this functionality, modifications to RDTSC should still require that the less significant bits of the return value become unpredictable over time.

A further principle of implementation is that of relative accuracy. RDTSC instructions can be used to gather fine grained performance statistics. Multimedia applications and games, for example, use RDTSC to affect a short term delay by spinning until RDTSC reaches a particular value. For the RDTSC results to make sense in these cases, successive calls to RDTSC should have a difference that accurately reflects the number of cycles between the two calls. This property is referred to as the relative accuracy of RDTSC, meaning that a return value is accurate relative to a previous call. Modification to RDTSC behavior (or that of other time-information requests) should maintain a degree of relative accuracy. It is to be noted that relative accuracy is not a correctness constraint. Software should be resilient to a variety of return values returned by RDTSC, because even without the changes, the RDTSC instruction itself can take a variable number of cycles to execute due to the state of caches, dynamic voltage and frequency scaling (DVFS), scheduling, etc.

Yet another principle of implementation is that of absolute accuracy. The timestamp counter value tells the program for how many cycles the processor has been running, and it is possible that some programs use RDTSC to acquire that information. For instance, a program might use RDTSC to send an email to the system administrator after a computer has been running for more than 10 days. Any timekeeping and timekeeping acquisition behavior modifications should thus enable systems to continue acquiring accurate information when necessary.

The above principles of operation are satisfied by the example embodiments of the obfuscation process described in relation to FIG. 2 (e.g., delaying delivery of requested time-information until the end of the current epoch, and further delaying for a random portion of the subsequent epoch, and/or fuzzing a read value of a clock module by some random portion of the subsequent epoch). For example, performance of an obscured RDTSC process will result in increasing timekeeping information, and the relative accuracy will be at most inaccurate by $2^{e+1}$ cycles. Furthermore, while execution of RDTSC instructions will be slowed down because of the real delays, the throughput of the system will be largely unaffected except for unusual programs or processes that load/run the RDTSC frequently. Most applications, however, do not call RDTSC frequently enough for significant slowdown to result.

The approach for delaying and fuzzing the delivery of timing information in response to a process to obtain timing information from, for example, a device's clock modules (such as the TSC) may also be applied to other types of clock modules and counters. For example, some processors have built-in counters of micro-architectural events that could potentially be used as a basis for sophisticated side channel attacks. For instance, a spy program with access to a branch-prediction-miss counter might be able to circumvent the inaccuracy associated with making timing measurements and guess whether a given interval represents a hit or miss. Typically, these performance counters are available in kernel-space, but may also be available in user-space for fine grain performance measurements. Accordingly, the obfuscation approach described herein may also be applied to these types of performance counters so as to obscure delivered timing information. Implementations of processes to delay and obscure delivered timing information may be relatively easy to implement and enforce because few operating system processes and applications rely on the accuracy of these performance counters. Counters that can represent data-dependent information, such as cache misses or branch misses, are particularly important to obscure. To effectively implement the obfuscation process for these types of performance counters, an appropriate epoch length would need to be determined that would ensure that spy processes could not glean information from obscured timing information delivered from these counters.

In addition to internal clock modules, another way through which a spy process may obtain timing information includes use of virtual clocks (which include virtual time stamp counters, or VTSC). One way to implement a virtual clock is based on a situation where a process has two threads, A and B, each running on separate cores and sharing a memory address X. The thread A may initialize a local register to zero, and may then run an infinite loop of incrementing the local register and storing it to X. Assuming no other thread is attempting to read X, this implementation would increment X at a rate of about one per cycle. To use this information, the thread B would read X immediately before and directly after the instructions it wishes to time and calculate the difference, mimicking, in effect, some embodiments of operations of a request for timing information, such as operations performed in response to an RDTSC instruction. Thus, this virtual clock implementation, referred to as W→R VTSC, creates write/read shared memory communication.

Another way to implement a virtual clock that may be used by a spy/rogue process to obtain timing information is one implemented with a write/write shared memory communication (referred to as a W→W VTSC). In this implementation, an attacker would use two timer threads T1 and T2 and one probe thread P, as well as two shared memory addresses X and Y. The thread T1 will run in a tight loop of loading X, incrementing it, and storing it back to X. The thread T2 will do the same for Y. To make a timing measurement, P will set X to 0, perform the timed set of instructions, and then set Y to 0. Afterward, T1 and T2 can be terminated and the resulting value of (Y−X) can provide the timing information.

To counter attacks by spy processes that obtain timing information through virtual clock implementations, a process may be configured to detect or identify VTSC shared memory communications so as to identify instances of W→R or W→W operations/communications with as few false positives as possible, and perform delay operations that obscure any timing information a VTSC could obtain through such operations/communications. Additionally and/or alternatively, dedicated hardware may be realized that includes a detector (identifier) to identify instances of, for example, W→R or W→W communications, and a delay producer to insert delays to obscure timing information.

Thus, in some embodiments, a process may be configured to perform operations that include identifying memory-access processes, including performing one or more of, for example, identifying a first process including a write operation to a shared memory location followed by a read operation from the shared memory location, and/or identifying a second process including a first write operation to the shared memory location followed by a second write operation. In some embodiments, delaying the delivery of the timing information can include causing an exception condition for the processor-based device in response to identification of the memory-access process. In some embodiments, delaying the delivery of the timing information may include delaying the delivery of timing information for a period equal to at least a random-based period. For example, the delivery of data retrieved during a shared memory access operation that is determined to have been potentially performed by a rogue process may be delayed by a period equal to a random value in the range of $2^{e-1}$ and $2^e-1$, where e is the obfuscation parameter controlling the level of obfuscation, as described herein. In some embodiments, the delivery of data retrieved as a result of a shared memory access operation may, like in the case of delaying timing information obtained from requests (e.g., RDTSC instructions) for such information, be delayed by a value equal to a sum of a remainder of clock cycles in a current epoch interval and a random-based portion of the clock cycles in a following epoch interval, where at least one of these epoch intervals includes a duration equal to a value in a range between $2^{e-1}$ clock cycles and $2^e-1$ clock cycles.

To reduce the number of false positive of detected/identified shared memory operations/communications that are not part of a spy process attempting to obtain timing information through a virtual clock implementation, in some embodiments, a process (or processor) to counter these types of spy processes may be configured to keep track of lifetimes of cache accesses and trigger VTSC obfuscation when a memory location (e.g., a cache location) that is determined to have been recently updated (and thus is determined to be potentially part of an attempt to implement a virtual clock) is accessed. For example, in some implementations, two additional bits, referred to as TLU (Time of Last Use), can be added to each private L1 cache line (and/or to other storage media), with those bits representing how recently the core interacted with the line. In some embodiments, these bits will be initialized to '00' when a new cache line is installed in the cache, and set to '11' when a cache line is used by a thread. Periodically, any non-zero TLU will be decremented by 1. When another core or thread requires read or write access to a cache line and its TLU bits are non-zero, i.e., when the last accessed is still deemed to be recent because the value of the TLU has not had sufficient time to be decremented to '00', a VTSC violation is reported. This detection approach can catch both W→R and W→W events, while filtering out false positives for old (non-recent) reads/writes that might otherwise cause additional slowdown.

Figure 3:
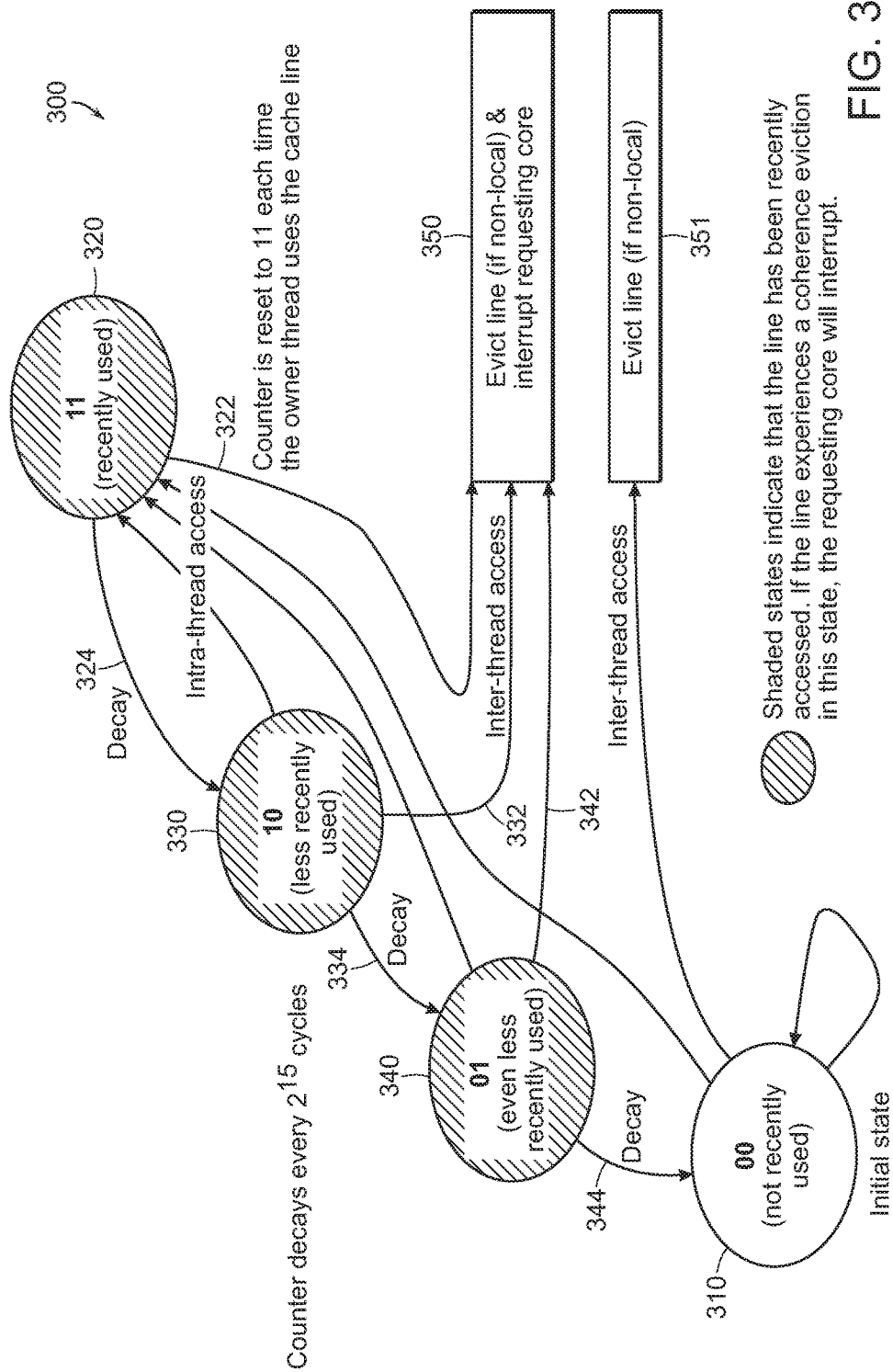
FIG. 3 is a diagram illustrating operational states for Time of Last Use (TLU) bits to enable determination of occurrence of virtual time stamp counters (VTSC) violations.

For example, with reference to FIG. 3, a diagram illustrating operational states for TLU bits that enable determination of whether or not a VTSC violation is to be triggered is shown. As noted, in some embodiments, TLU bits of a shared memory location (e.g., a particular cache line) may be set to an initial state 310 of '00'. Upon access of this shared memory location (reading or writing-type access), the TLU bits are set to a state 320 in which the bits are set to a value of '11', indicating a very recent access to this location (an inter-thread access results in line eviction via operation 351). Any subsequent memory access, generally by a different thread, to this location while the TLU bits are in state 320 (with a value of '11') will trigger a VTSC violation (as illustrated by arrow 322), and will result in line eviction and interrupt requesting operations 350. An access (e.g., inter-thread access) to the corresponding memory location following a recent earlier access may be indicative that a spy process is attempting to use the memory location for virtual clock time keeping.

After some pre-determined period elapses since the setting of the TLU to '11' (for example, after $2^4$, $2^8$, $2^{12}$, $2^{15}$, or any other pre-determined number of clock cycles), the TLU bits are decremented by 1 (the TLU is "decayed"), as illustrated by the by arrow 324, to enter state 330 where its value is '10'. During this state, the memory access to the corresponding memory location is still considered to have been a recent access, and therefore, an attempt to access this location while the TLU is in the state 330 will also trigger a VTSC violation, as illustrated by arrow 332, to cause the operations 350. However, if there has not been access for some pre-determined time (which may be different from the pre-determined time before a TLU is decayed from the state 320 to the state 330), the TLU is again decremented (decayed), as illustrated by arrow 334, to reach state 340, where the TLU is set to a value of '01'.

At this state the TLU is still considered to have been recently accessed for the purpose of evaluating the possibility of a VTSC violation, and, therefore, if there is an access attempt (e.g., inter-thread access attempt) to the corresponding memory location while the TLU is in the state 340, a VTSC violation is trigger, as illustrated by arrow 342, causing the operations 350. If the memory location remains access-free for an additional pre-determined period (which may be the same or different than the pre-determined periods preceding the decays of the TLU from the state 320 to the state 330, or from the state 330 to the state 340), the TLU bits will be decremented (as illustrated by arrow 344) and reach the initial state 310. Any subsequent access attempt will not be considered to be a VTSC violation, and therefore upon an inter-thread access of the corresponding memory location, the TLU will be set again to the state 320 (with a TLU value of '11'). It is to be noted that, in some embodiments, intra-thread accesses of a memory location when its TLU bits are in a state where their value is not '00' will generally just cause the bits to be set back to a value '11' (indicating a recent memory access). Thus, in some embodiments, the obfuscation process may further include determining time information regarding most recent access of a shared memory location, and delaying the delivery of the timing information based, at least in part, on the determined time information regarding the most recent access of the shared memory location.

The VTSC violation can be reported to the operating system as an interrupt when an inter-thread operation/communication occurs. These implementations are generally minimal in terms of area requirements. It is to be noted that generally two or more bits would be required to implement this filtering methodology. This is because if one bit were used, VTSC operation/communication events happening just before and just after flash clearing a single bit will not be caught. This problem is avoided with two bits that decay with time at an appropriate rate because this provides a minimum separation between successive memory access operations (e.g., a read and a write), which is the time period for the decay operation. On an architecture with 64 sets of 4-way associative cache lines, the TLU modification will result in 512 additional bits per core. If the cache lines are 64 bytes each, this amounts to a 0.4% overhead. The implemented process associated with checking for non-zero TLU (be it hardware of software implementation of conditional logic) can be implemented in parallel with the cache line fetching without significantly impacting clock frequency or latency.

As for the delay functionality, the produced delay should obscure the timing information associated with race conditions. In some embodiments, allowing the operating system to handle an empty interrupt can be enough to obscure the timing information. It should be noted that the VTSC modifications described herein may cause noticeable slowdowns in programs that have tight inter-thread locking mechanisms. However, such locking mechanisms are usually found in system programs, where the modifications described herein generally do not apply (e.g., because attackers with privileged access do not need side channels to steal information). For locks in highly contended user mode programs, performance pathologies may result, but overall, many locks in production applications are acquired without contention.

Figure 4:
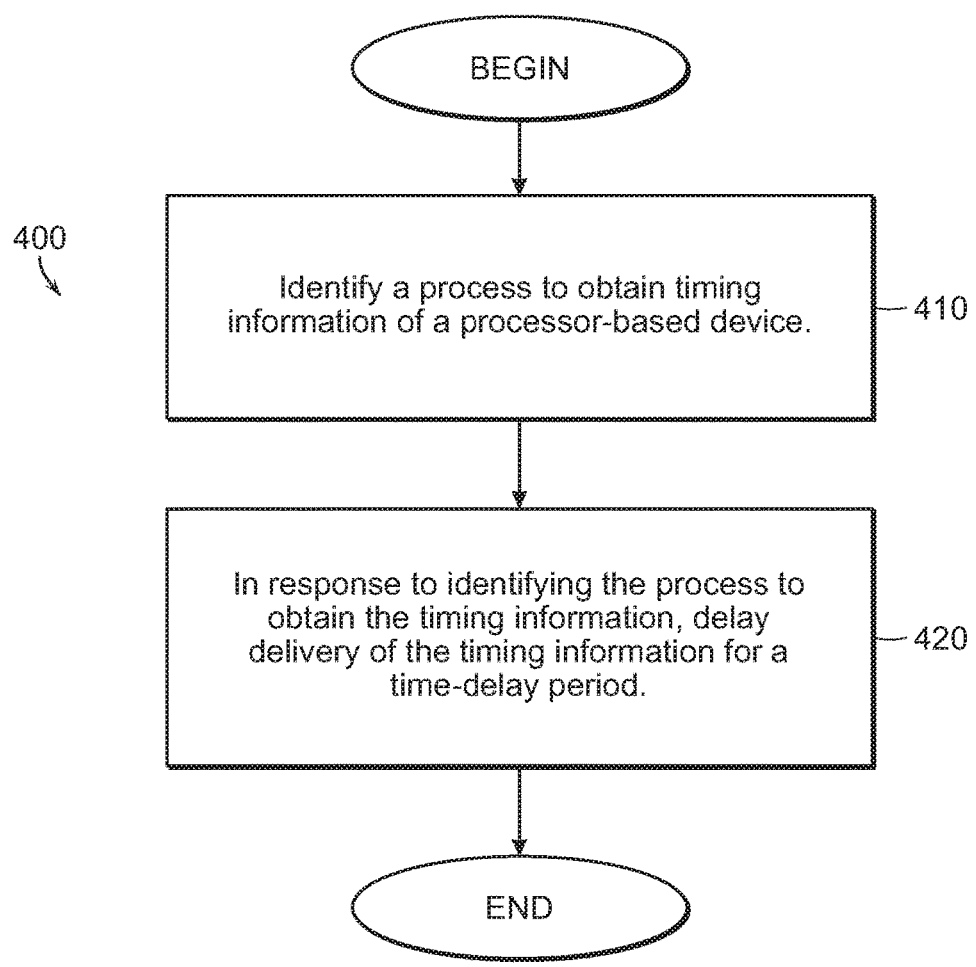
FIG. 4 is a diagram of an example procedure to counter side channel attacks.

With reference now to FIG. 4, a diagram of an example procedure 400 to counter side channel attacks is shown. The procedure 400 includes identifying 410 a process to obtain timing information of a processor-based device. As noted, in some embodiments, the identified process may include a request for timing information (e.g., the request may be in the form of an instruction such as RDTSC or the TSCWF instruction described herein), or it may include a shared-memory access operation which could be used in the course of implementing a virtual clock by a spy process. In some embodiments, to identify a process as being a process to obtain timing information, individual instructions and/or instruction sequences may be compared to known instructions/instruction sequences corresponding to processes to obtain timing information. When a particular instruction (or instruction sequence) matches one of the known instructions (or instruction sequences), a determination can be made that the current instruction (or current instruction sequence) corresponds to a process to obtain timing information.

In response to identifying the process to obtain the timing information, delivery of the timing information is delayed 420 for a time-delay period. For example, as described herein, delaying the delivery of timing information could include delaying the delivery of the timing information for a period equal to a sum of a remainder of clock cycles in a current epoch interval and a random-based portion of the clock cycles in a following epoch interval, with at least one of these epoch intervals including a duration equal to a value in a range between $2^{e-1}$ clock cycles and $2^{e}-1$ clock cycles, where e is a predetermined value representative of a level of timing information obfuscation.

In some embodiments, the processor-based device with respect to which timing information is obtained may include, for example, processor-based devices such as micro-processors, field programmable gate arrays, and other types of hardware. The processor-based device may also include hardware implementations that include "backdoors" that facilitate surreptitious/malicious data procurement from processor-based devices. The term "backdoors" generally refers to malicious modifications to hardware (e.g., by insiders, such as engineers involved in the development of the hardware, etc.) that provide a foothold into any sensitive or critical information in the system. A malicious modification, or a backdoor, can come from a core design component (e.g., a few lines of Hardware Design Language (HDL) core code can be changed to cause malicious functionality), from third-party vendors providing components (e.g., memory controllers, microcontrollers, display controllers, DSP and graphics cores, bus interfaces, network controllers, cryptographic units, and an assortment of building blocks, such as decoders, encoders, CAMs and memory blocks) used in the hardware implementation. Because of the general complexity of hardware implementations, it is usually very difficult to find carefully hidden backdoors, even if thorough code and hardware audits/reviews are performed. Further details regarding "backdoors" deployed in hardware (such as processors) are provided, for example, in U.S. application Ser. No. 13/273,016, entitled "System and Methods for Silencing Hardware Backdoors," the content of which is incorporated herein by reference in its entirety.

Performing the various operations described herein may be facilitated by a processor-based computing system. Particularly, each of the various devices/systems described herein may be implemented, at least in part, using one or more processor-based devices. Thus, with reference to FIG. 5, a schematic diagram of a generic computing system 500 is shown. The computing system 500 includes a processor-based device 510 such as a personal computer, a specialized computing device, and so forth, that typically includes a central processor unit 512. In addition to the CPU 512, the system includes main memory, cache memory and bus interface circuits (not shown in FIG. 5, but examples of a bus and cache arrangement are shown in FIGS. 1a-c). The processor-based device 510 may include a mass storage element 514, such as a hard drive or flash drive associated with the computer system. The computing system 500 may further include a keyboard 516, or keypad, or some other user input interface, and a monitor 520, e.g., a CRT (cathode ray tube) monitor, LCD (liquid crystal display) monitor, etc., that may be placed where a user can access them.

The processor-based device 510 is configured to facilitate, for example, the implementation of operations to counter and mitigate side channel attacks, including such operation as identifying processes seeking to obtain timing information, and, in response to identifying such processes, delaying the delivery of the timing information. The storage device 514 may thus include a computer program product that when executed on the processor-based device 510 causes the processor-based device to perform operations to facilitate the implementation of the above-described procedures and operations. The processor-based device may further include peripheral devices to enable input/output functionality. Such peripheral devices may include, for example, a CD-ROM drive and/or flash drive (e.g., a removable flash drive), or a network connection (e.g., implemented using a USB port and/or a wireless transceiver), for downloading related content to the connected system. Such peripheral devices may also be used for downloading software containing computer instructions to enable general operations of the respective systems/devices. Alternatively and/or additionally, in some embodiments, special purpose logic circuitry, e.g., an FPGA (field programmable gate array), an ASIC (application-specific integrated circuit), a DSP processor, etc., may be used in the implementation of the system 500. Other modules that may be included with the processor-based device 510 are speakers, a sound card, and/or a pointing device, e.g., a mouse or a trackball, by which the user can provide input to the computing system 500. The processor-based device 510 may include an operating system, e.g., WINDOWS XP® Microsoft Corporation operating system, UBUNTU operating system, etc.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" may refer to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Some or all of the subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an embodiment of the subject matter described herein), or any combination of such back-end, middleware, or front-end components. The components of the system may be interconnected by any form or medium of digital data communication (e.g., a communication network). Examples of communication networks (wired and/or wireless) include a local area network ("LAN"), a wide area network ("WAN"), and the Internet.

The computing system may include clients and servers. A client and server are generally remote from each other and typically interact through a communication network. The relationship of client and server generally arises by virtue of computer programs running on the respective computers and having a client-server relationship to each other.

The systems, methods, devices, products, approaches, and other implementations described herein can be demonstrated to be sufficient to prevent an attacker from getting information pertaining to micro-architectural events. Particularly, programs can generally be classified into two categories: nondeterministic or deterministic programs. An attacker's program (i.e., spy process) cannot be deterministic because it would produce the same output irrespective of the micro-architectural state. Therefore, a micro-architectural attack requires non-determinism to succeed.

An attacker's program usually does not have root access, and thus exists within an operating system abstraction of a process or set of processes. In such an abstraction, a process undergoes non-deterministic behavior in three ways: non-deterministic hardware instructions, accessing shared memory, and system calls.

Most hardware instructions executed by a CPU are deterministic (e.g., adds, multiplies, jumps, etc.) Serial execution of deterministic instructions is itself also deterministic. However, instructions that read hardware processor state are non-deterministic, as their input values do not determine their outputs. If the output of an instruction does not change with repeated execution, the instruction cannot be used in a micro-architectural attack. An example of this is the CPUID instruction on x86. Performance counters, on the other hand, are non-deterministic and thus present a possible way to learn about micro-architectural events. However, most instruction set architectures (ISAs) only allow privileged programs to query performance counters, and, therefore, they currently do not pose a threat. The time stamp counter, on the other hand, is an exception: it is available to all programs, and therefore provides one of the feasible ways by which a process can create the non-determinism necessary to detect a micro-architectural event. Accordingly, approaches to obfuscate timing information provided through a time stamp counter would thwart one of the few feasible ways a spy process can exploit non-deterministic behavior of a processor's processes.

As noted, another way for a spy process to exploit non-deterministic processor behavior is through shared-memory accesses. For a program to detect a micro-architectural event using shared memory, there must be a load or store operation whose outcome depends on that event. As loads and stores are themselves deterministic in the value that they read or write, it is generally only by the interleaving of these instructions/operations that an event can be sensed. Without loss of generality, consider two threads of execution that share memory and conspire to detect a micro-architectural event. The interleaved instructions have to be a load and a store operations, or a store and a store operations—two loads cannot discover their own interleaving. Furthermore, the interleaving of the two instructions must depend upon a micro-architectural event, meaning that they must happen at very nearly the same time. From these observations, it can be concluded that rapid inter-thread communication through shared memory using either load/store or store/store interleavings is the only way for a micro-architectural event to be detected on the basis of shared-memory interaction. Accordingly, approaches to obfuscate timing information provided through load/store or store/store interleaving share-memory operations would thwart this spy mechanism's attempt to exploit non-deterministic behavior of a processor's processes.

System calls also introduce non-determinism into a process, as their return values cannot always be determined by their inputs. Barring a scenario where the operating system exposes performance counters via system calls, a spy process would need to gain timing information through the system call sufficiently accurate to detect micro-architectural events. However, in practice, the overhead of a system call is generally too great to allow such timing information to propagate to the spy process. Even with newer instructions that allow low-overhead system call entry and exit, a system call usually takes hundreds or thousands of cycles purely in overhead. With such an unpredictable and lengthy timing overhead, system calls cannot provide useful timing information. Even considering that a system call returns with data from a highly accurate clock (such as a network read from another computer using RDTSC), the accuracy of the timing information will be degraded too greatly to be useful.

Thus, as shown, depriving a spy process of fine grain ISA timers (like RDTSC) and disrupting the timing of inter-thread communications/operations is generally sufficient to prevent/inhibit, and even deter, micro-architectural side channel attacks.

The systems, methods, devices, products, approaches, and other implementations described herein can also be shown to be generally immune from statistical analysis as a way for a spy program to glean processes' information. Particularly, consider the general case of using RDTSC to detect the presence or absence of a micro-architectural event for some contiguous sequence of instructions. To make timing measurements on this sequence, an attacker will have to execute RDTSC once before the section and once afterward. In the analysis provided herein, two example calls used in the analysis are denoted $RDTSC_1$ and $RDTSC_2$, and their respective return values are denoted $R_1$ and $R_2$. The attacker's aim is to distinguish between two possibilities, one of which is slower (a duration of $T_S$ cycles) and one which is faster (a duration of $T_F$ cycles). For the purpose of the analysis, $T_F$ and $T_S$ can be assumed to be close in value, but not equal. The difference between the two durations is denoted $T_\Delta$, where $T_S = T_F + T_\Delta$.

According to the RDTSC obfuscation approach described herein, executing $RDTSC_1$ will delay the attacker for an unknown time duration offset into the subsequent epoch. This physical offset is denoted D, where $D \in [0; E)$. The attacker cannot influence D, nor can the attacker directly measure D, as the return value will contain an unrelated apparent offset. The attacker will then execute the instructions, which takes $T_F$ cycles to complete in the "fast" case. The "slow" case takes an additional $T_\Delta$ cycles. The attacker will also call $RDTSC_2$, which will delay the instruction for a random time duration in the subsequent epoch, and then return $R_2$. From the value $R_2$, the attacker may only determine how many integer epochs elapsed since $R_1$. In other words, the attacker can only determine/compute $$\left\lfloor \frac{D + T_i}{E} \right\rfloor,$$

where $T_i$ is either $T_F$ or $T_S$.

In the "fast" case, the attacker's offset into his epoch will be $(D+T_F)$ mod E. The offset $T_F$ mod E is denoted as $T_0$ such that $T_F = nE + T_0$ for some integer n, so that the attacker's offset can be re-written as $$n + \left\lfloor \frac{D + T_i}{E} \right\rfloor.$$

The attacker's offset is denoted as $N_F$. The attacker's measurement of $N_F$ will always be either n or n+1. Assuming D is evenly distributed, the probability of each measurement is:

$$Pr(N_F = n) = \frac{T_0}{E}$$

$$Pr(N_F = n+1) = 1 - \frac{T_0}{E}$$

Consider now the "slow" case, where the timed code section takes $T_F + T_\Delta$ cycles. Using the same logic as above, the offset of the attacker immediately before $RDTSC_2$ will be $D + T_0 + T_\Delta$, and thus the attacker's only new information from the measurement will be $N_S$, where $$N_S = \left\lfloor \frac{D + T_S}{E} \right\rfloor.$$

The probability of all possible measurements is thus:

$$Pr(N_S = n) = \max\left(1 - \frac{T_0 + T_\Delta}{E}, 0\right)$$

$$Pr(N_F = n+1) = 1 - \left|\frac{T_0 + T_\Delta}{E} - 1\right|$$

$$Pr(N_S = n+2) = \max\left(0, \frac{T_0 + T_\Delta}{E} - 1\right)$$

Recalling that $T_\Delta \ll E$, the probabilities for the attacker to measure the outcome n or n+1 can be seen to be nearly identical whether the "fast" or "slow" case has occurred. It can also be seen that the probability of measuring n+2 in the slow case is either very small or zero, depending on the value of $T_0$ (in the fast case it is always zero). Thus, n+2 is a unique result that cannot be measured if the timed section is fast. If the timed section is slow, the attacker will only have a zero probability of measuring n+2, unless $T_0$ is in the range $[E-T_\Delta, E)$. In this range, the attacker will only succeed (to obtain timing information based on a statistical analysis) if the random real offset is also in $[E-T_\Delta, E)$. This means that the attacker would have to make $$\Theta\left(\left(\frac{E}{T_\Delta}\right)^2\right)$$

measurements to observe an n+2 event. Therefore, the running time cost for an attacker to learn even a small amount of secret information is increased by this ratio as well. For example, if $$\frac{E}{T_\Delta} = 1000,$$

then an attack that previously took 5 minutes will instead take on average about ten (10) years.

To test the methods, devices, systems, and other implementations described herein, a virtual machine was implemented to emulate, in one test, the modification for an RDTSC instruction. Accordingly, KVM, which is an open source virtual machine, was modified to trap and emulate every RDTSC instruction. In the trap handler, a delay function and fuzzing scheme were implemented. An epoch length of $2^{13}$ (i.e., 8192) cycles was used. It is to be noted that by using hardware virtualization, more cycles could be run than otherwise would be possible using a full simulator, and thus responsiveness could be better tested. It was observed that the physical delay introduced into KVM caused some RDTSC instructions to be emulated out of order. While the overall delay remains the same, the exact placement of the delay within the program execution may vary. This may temper the efficacy of the protection, but still enables correct evaluation of the performance effects.

Using the modified RDTSC instruction (e.g., to introduce obfuscating delay in response to identifying requests for timing information) in a system in which a Ubuntu operating system was installed and booted in a 4-core virtual machine, and in which an application such as FIREFOX was opened to browse the web, and FLASH application was run, did not cause noticeable slowdown or unexpected process behavior. In another test, Windows WINDOWS XP operating system was installed and booted in a 2-core virtual machine, and the INTERNET EXPLORER 8 application was opened to enable web browsing. Here too, behavior, including that of multimedia applications such as Flash, had no noticeable slowdown compared with a system with an unmodified RDTSC functionality (i.e., without RDTSC obscured).

To test the efficacy of obscuring VTSC timing information, an attacker program was developed capable of using VTSC to distinguish between an L1 cache hit and a main memory access. On the testing apparatus, these corresponded to measurements of 75 cycles and 224 cycles, respectively (including delay from serializing instructions). The performance monitoring unit on a Nehalem device was configured to trigger an interrupt on every W→R event, and modified the Linux kernel to handle these interrupts. It was determined that the delay of the interrupt alone caused the VTSC to become inoperable, giving indistinguishable results for L1 hits and misses.

Figure 6:
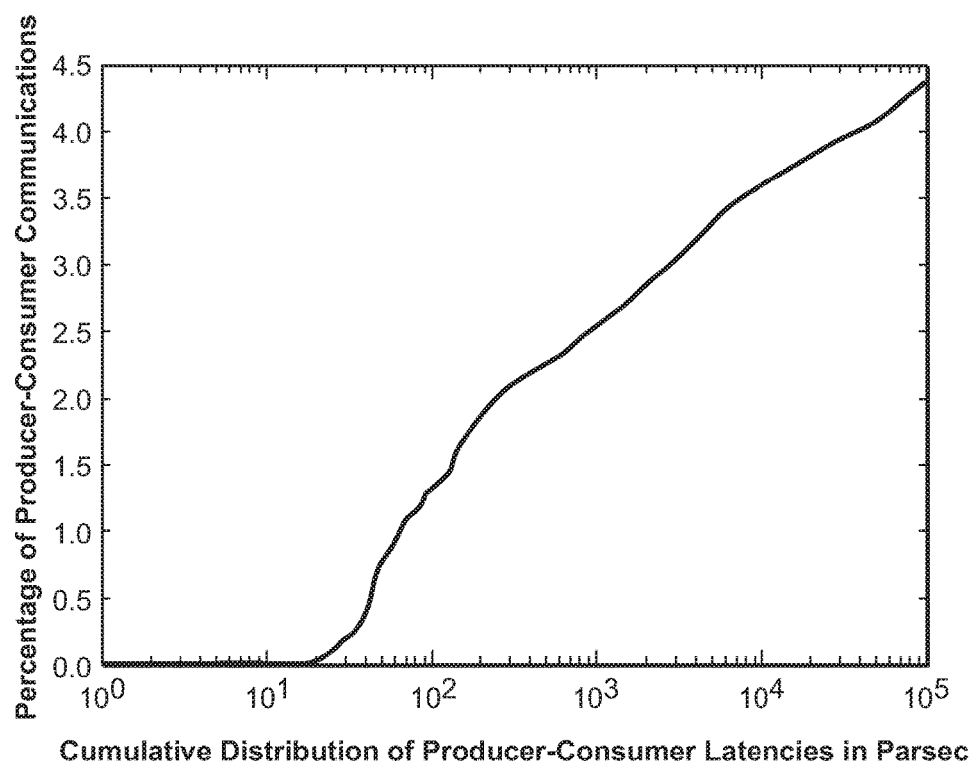
FIG. 6 is a graph of an example cumulative distribution function showing communication latency in Parsec applications.

Additionally, the PARSEC benchmark suite was run to determine the performance cost of the methods, devices, and other implementations that rely on existing hardware. It was determined that most benchmarks exhibited a slowdown of less than 1.2%, while two outliers, dedup and streamcluster, experienced slowdowns of 14% and 29%, respectively. The geometric average slowdown was 4%. This slowdown should be considered a very conservative upper bound. As shown in FIG. 6, the majority of sharing events that were captured happened well outside of a ten thousand cycle threshold, meaning that the implemented VTSC detector would not trigger on these events.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method comprising:
   identifying, from a received sequence of instructions, a time-read instruction to obtain clock-produced timing information from a clock module of a processor-based device; and,
   performing a timing data obfuscation process in response to identifying the time-read instruction to obtain the clock-produced timing information without performing the timing data obfuscation process for other instructions in the received sequence of instructions that do not match sequences of one or more instructions corresponding to a process to obtain timing information, wherein performing the timing data obfuscation process comprises:
      delaying execution of the time-read instruction to obtain the clock-produced timing information until an end of a current epoch, the current epoch including a current epoch interval length based, at least in part, on a random number of clock cycles;
      subsequent to the execution of the time-read instruction to obtain the clock-produced timing information, modifying the clock-produced timing information, obtained through the execution of the time-read instruction to obtain the clock-produced timing information, by adding a random offset to the clock-produced timing information to produce modified timing information; and
      delivering the modified timing information, subsequent to modifying the clock-produced timing information, after a delay period equal to a random-based portion of a subsequent epoch with a subsequent epoch interval length equal to a subsequent random number of clock cycles.

2. The method of claim 1, wherein identifying the time-read instruction comprises:
   identifying execution of the time-read instruction to read the clock module of the processor-based device.

3. The method of claim 2, wherein identifying the execution of the time-read instruction to read the clock module comprises:
   identifying execution of an instruction to read a time stamp counter (TSC) of the processor-based device.

4. The method of claim 1, further comprising:
   determining the current epoch interval length as a first random value in a range between $2^{e-1}$ clock cycles and $2^e-1$ clock cycles, wherein e is a predetermined value representative of a level of timing information obfuscation; and
   determining the subsequent epoch interval length for the subsequent epoch as a second random value in the range between $2^{e-1}$ clock cycles and $2^e-1$ clock cycles.

5. The method of claim 1, wherein delaying the execution of the time-read instruction to obtain the clock-produced timing information and modifying the clock-produced timing information comprise:
   stalling execution of operations to perform a request to obtain the clock-produced timing information for a remainder of clock cycles in the current epoch;
   storing in a memory location a value of a time stamp counter (TSC) of the processor-based device;
   further stalling the execution of the operations to perform the request to obtain the clock-produced timing information for the random-based portion of the subsequent random number of clock cycles in the subsequent epoch; and adding a randomly selected value from a range between 0 and the subsequent epoch interval length to the value stored in the memory location.

6. The method of claim 1, further comprising:
returning a timing information value corresponding to a time stamp counter (TSC) value at the end of a period equal to a sum of a remainder of the clock cycles in the current epoch and the random-based portion of the clock cycles in the subsequent epoch.

7. The method of claim 1, further comprising:
disabling one or more countermeasures to identify and respond to one or more processes to obtain the clock-produced timing information of the processor-based device.

8. The method of claim 7, wherein disabling the one or more countermeasures comprises:
disabling operations to obfuscate the clock-produced timing information.

9. The method of claim 8, wherein disabling the operations to obfuscate the clock-produced timing information comprises:
disabling the operations to obfuscate the clock-produced timing information in response to a determination that an indicator is set to a pre-determined value.

10. The method of claim 1, wherein identifying the time-read instruction to obtain the clock-produced timing information comprises identifying one or more memory-access processes, wherein identifying the one or more memory-access processes comprises one or more of:
identifying a first process including a write operation to a shared memory location followed by a read operation from the shared memory location, or
identifying a second process including a first write operation to the shared memory location followed by a second write operation.

11. The method of claim 10, wherein delaying the execution of the time-read instruction to obtain the clock-produced timing information and delivering the modified timing information after the delay period comprise:
causing an exception condition for the processor-based device in response to identification of the one or more memory-access processes.

12. The method of claim 10, further comprising:
determining time information regarding a most recent access of the shared memory location,
wherein delaying the execution of the time-read instruction to obtain the clock-produced timing information and delivering the modified timing information after the delay period are based, at least in part, on the determined time information regarding the most recent access of the shared memory location.

13. The method of claim 12, wherein determining the time information comprises:
determining a value of Time of Last Use (TLU) bits associated with the shared memory location, wherein the TLU bits are set to a pre-determined value when accessed and are periodically decremented to represent length of time since the shared memory location was accessed.

14. The method of claim 1, wherein the processor-based device comprises one or more of: a microprocessor or a field programmable gate array (FPGA).

15. The method of claim 1, wherein identifying the time-read instruction to obtain the clock-produced timing information of the processor-based device comprises:
identifying a back-door process, implemented via at least one back-door in the processor-based device, to obtain the clock-produced timing information to facilitate unauthorized procurement of data from the processor-based device.

16. The method of claim 1, wherein the clock module is implemented using a virtual clock comprising one or more shared memory locations, and wherein the time-read instruction to obtain the clock-produced timing information comprises a plurality of memory access instructions to access at least one of the one or more shared memory locations.

17. The method of claim 16, wherein each of one or more shared memory locations is associated with periodically adjustable counters representative of time elapsed since the respective one or more shared memory locations was accessed, and wherein identifying the time-read instruction comprises determining, based on a time indication represented by a first periodically adjustable counter associated with a first shared memory location, that two of the plurality of memory access instructions accessed the shared memory location within a period of time that is shorter than a threshold time value.

18. A system comprising:
at least one processor; and
memory comprising computer instructions that, when executed on the at least one processor, cause operations comprising:
identifying, from a received sequence of instructions, a time-read instruction to obtain clock-produced timing information from a clock module of a processor-based device; and
performing a timing data obfuscation process in response to identifying the time-read instruction to obtain the clock-produced timing information without performing the timing data obfuscation process for other instructions in the received sequence of instructions that do not match sequences of one or more instructions corresponding to a process to obtain timing information, wherein performing the timing data obfuscation process comprises:
delaying execution of the time-read instruction to obtain the clock-produced timing information until an end of a current epoch, the current epoch including a current epoch interval length based, at least in part, on a random number of clock cycles;
subsequent to the execution of the time-read instruction to obtain the clock-produced timing information, modifying the clock-produced timing information, obtained through the execution of the time-read instruction to obtain the clock-produced timing information by adding a random offset to the timing information to produce modified timing information; and
delivering the modified timing information after a delay period equal to a random-based portion of a subsequent epoch, with a subsequent epoch interval length equal to a subsequent random number of clock cycles.

19. The system of claim 18, wherein the memory comprises further instructions to cause further operations comprising:
determining the current epoch interval length as a first random value in a range between $2^{e-1}$ clock cycles and $2^e-1$ clock cycles, wherein e is a predetermined value representative of a level of timing information obfuscation; and determining the subsequent epoch interval length for the subsequent epoch as a second random value in the range between $2^{e-1}$ clock cycles and $2^e-1$ clock cycles.

20. The system of claim 18, wherein the memory further comprises instructions to cause further operations comprising:

disabling one or more countermeasures to identify and respond to one or more processes to obtain the clock-produced timing information of the processor-based device.

21. The system of claim 18, wherein the instructions that cause the operations of identifying the time-read instruction to obtain the clock-produced timing information comprise instructions to cause further operations comprising:

identifying one or more memory-access processes, wherein identifying the one or more memory-access processes comprises one or more of:
identifying a first process including a write operation to a shared memory location followed by a read operation from the shared memory location, or
identifying a second process including a first write operation to the shared memory location followed by a second write operation.

22. The system of claim 21, wherein the instructions that cause the operations of delaying the execution of the time-read instruction to obtain the clock-produced timing information and delivering the modified timing information after the delay period comprise instructions to cause further operations comprising:

causing an exception condition for the processor-based device in response to identification of the one or more memory-access processes.

23. A non-transitory computer readable medium programmed with a set of instructions executable on at least one processor that, when executed, cause operations comprising:

identifying, from a received sequence of instructions, a time-read instruction to obtain clock-produced timing information from a clock module of a processor-based device; and, performing a timing data obfuscation process in response to identifying the time-read instruction to obtain the clock-produced timing information without performing the timing data obfuscation process for other instructions in the received sequence of instructions that do not match sequences of one or more instructions corresponding to a process to obtain timing information, wherein performing the timing data obfuscation process comprises:

delaying execution of the time-read instruction to obtain the clock-produced timing information until an end of a current epoch, the current epoch including a current epoch interval length based, at least in part, on a random number of clock cycles;

subsequent to the execution of the time-read instruction to obtain the clock-produced timing information at the end of the current epoch, modifying the clock-produced timing information obtained through the execution of the time-read instruction to obtain the clock-produced timing information by adding a random offset to the clock-produced timing information to produce modified timing information; and delivering the modified timing information after a delay period equal to a random-based portion of a subsequent epoch with a subsequent epoch interval length equal to a subsequent random number of clock cycles.

24. The computer readable media of claim 23, further comprising further instructions to cause further operations comprising:

determining the current epoch interval length as a first random value in a range between $2^{e-1}$ clock cycles and $2^e-1$ clock cycles, wherein e is a predetermined value representative of a level of timing information obfuscation; and determining the subsequent epoch interval length for the subsequent epoch as a second random value in the range between $2^{e-1}$ clock cycles and $2^e-1$ clock cycles.

25. The computer readable media of claim 23, further comprising instructions to cause further operations comprising:

disabling one or more countermeasures to identify and respond to one or more processes to obtain the clock-produced timing information of the processor-based device.

26. The computer readable media of claim 23, wherein the instructions that cause the operations of identifying the time-read instruction to obtain the clock-produced timing information comprise instructions to cause further operations comprising:

identifying one or more memory-access processes, wherein identifying the one or more memory-access processes comprises one or more of:
identifying a first process including a write operation to a shared memory location followed by a read operation from the shared memory location, or
identifying a second process including a first write operation to the shared memory location followed by a second write operation.

27. The computer readable media of claim 26, wherein the instructions that cause the operations of delaying the execution of the time-read instruction to obtain the clock-produced timing information and delivering the modified timing information after the delay period comprise instructions to cause further operations comprising:

causing an exception condition for the processor-based device in response to identification of the one or more memory-access processes.

\* \* \* \* \*